(12) United States Patent
Hoover

(10) Patent No.: US 11,891,773 B2
(45) Date of Patent: Feb. 6, 2024

(54) HYDRAULIC PUMP DRIVE ASSEMBLY AND ROTARY MACHINE FIXTURE

(71) Applicant: DEERE & COMPANY, Moline, IL (US)

(72) Inventor: Matthew T. Hoover, Independence, KS (US)

(73) Assignee: DEERE & COMPANY, Moline, IL (US)

( * ) Notice: Subject to any disclaimer, the term of this patent is extended or adjusted under 35 U.S.C. 154(b) by 105 days.

(21) Appl. No.: 17/079,850

(22) Filed: Oct. 26, 2020

(65) Prior Publication Data

US 2022/0127819 A1 Apr. 28, 2022

(51) Int. Cl.
*E02F 9/08* (2006.01)
*E02F 9/22* (2006.01)
*E02F 9/20* (2006.01)

(52) U.S. Cl.
CPC ............ *E02F 9/0866* (2013.01); *E02F 9/202* (2013.01); *E02F 9/2058* (2013.01); *E02F 9/2278* (2013.01)

(58) Field of Classification Search
CPC ....... E02F 9/2058; E02F 9/202; E02F 9/0866; E02F 9/2278; B60K 2025/005
See application file for complete search history.

(56) References Cited

U.S. PATENT DOCUMENTS

| 8,702,560 | B2 * | 4/2014 | Ohno | B60W 30/18127 |
| | | | | 477/5 |
| 2014/0004986 | A1 * | 1/2014 | Sharpe | B64C 13/42 |
| | | | | 475/5 |
| 2016/0153174 | A1 * | 6/2016 | Naito | E02F 9/02 |
| | | | | 903/910 |

FOREIGN PATENT DOCUMENTS

| DE | 102019218277 A1 * | 8/2020 | ............ B60K 6/365 |
| DE | 102019218277 A1 | 8/2020 | |
| KR | 101977697 B1 | 5/2019 | |

OTHER PUBLICATIONS

2cy18/6 Gear Pump for Fuel Oil Transfer, pp. 1-7, [online]. Retrieved from the Internet <URL: https://hgmachinery.en.made-in-china.com/product/hBnQxksEsHVi/China-2cy18-6-Gear-Pump-for-Fuel-Oil-Transfer.html>.
German Search Report issued in application No. DE102021210183.6 dated Jun. 1, 2022 (12 pages).

* cited by examiner

*Primary Examiner* — Abiy Teka
(74) *Attorney, Agent, or Firm* — Christopher R. Christenson; Kelly, Holt & Christenson PLLC

(57) ABSTRACT

A rotary machine fixture couples a first rotary machine to a second rotary machine and fixes the first rotary machine and the second rotary machine to a work vehicle. A hydraulic pump drive assembly to supply hydraulic fluid for a work vehicle includes an electric machine configured to convert electrical energy from an electrical supply line to rotary motion, a hydraulic pump configured to circulate the hydraulic fluid through a hydraulic supply line from the rotary motion of the electric machine, a fixture having a first rotary machine interface configured to mount the electric machine to the fixture, a second rotary machine interface configured to mount the hydraulic pump to the fixture, and a work vehicle interface configured to mount the fixture to the work vehicle such that the hydraulic pump and the electric machine are fixed to the work vehicle through the fixture.

32 Claims, 2 Drawing Sheets

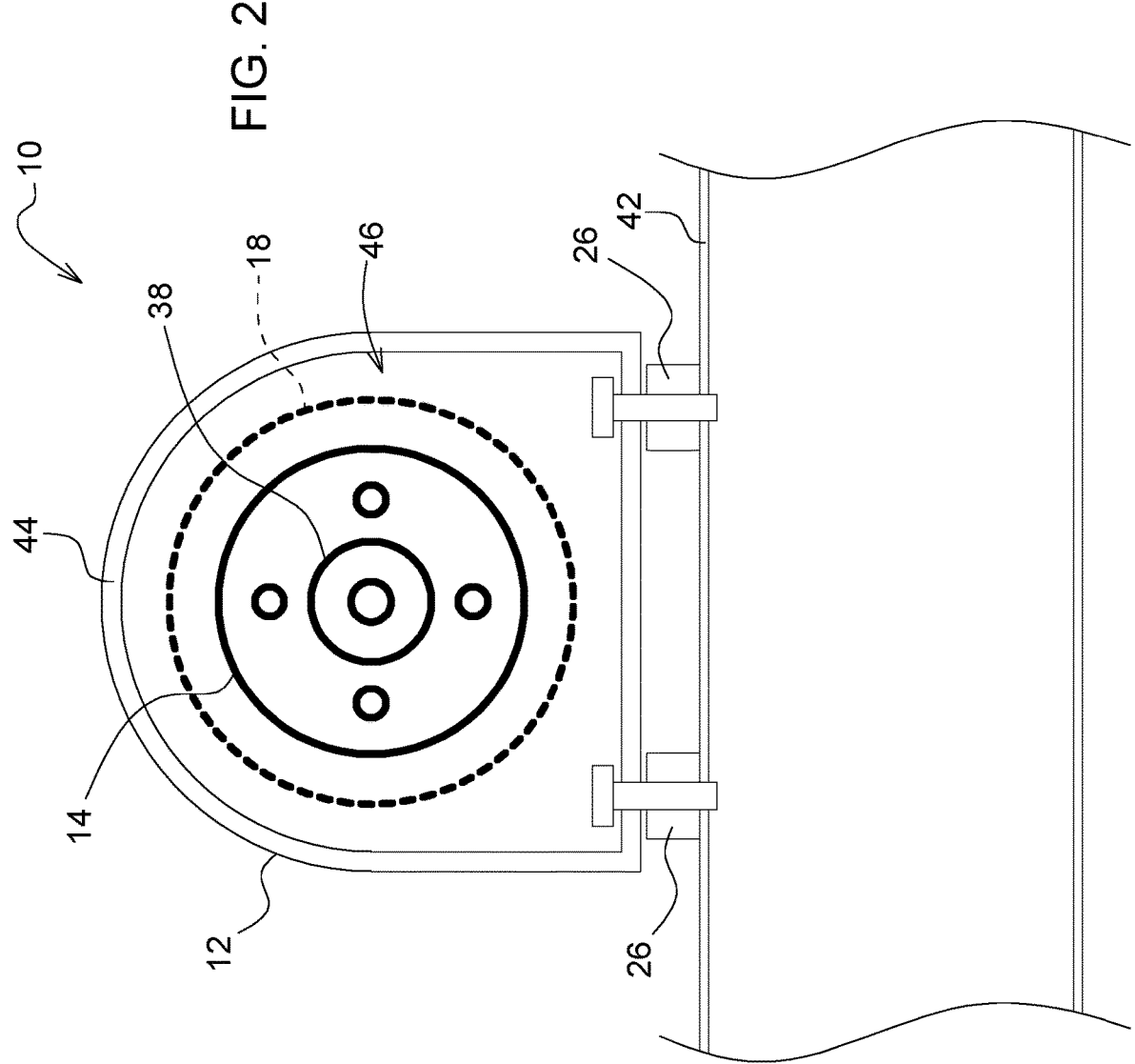

HYDRAULIC PUMP DRIVE ASSEMBLY AND ROTARY MACHINE FIXTURE

BACKGROUND

Work vehicles may have a diesel engine or other power plant providing motive or other power to the vehicle drivetrain and/or one or more implements or attachments of the work vehicle. Power may be sent to the one or more implements or attachments via a pressurized hydraulic circuit having one or more hydraulic pumps directly driven by the engine and one or more hydraulic motors that are actuated via the circulated and pressurized hydraulic fluid from the one or more hydraulic pumps. As work vehicle architectures evolve toward electrification of drivetrain and vehicle systems power, electrical energy may be stored onboard the work vehicle and utilized to operate the work vehicle and the one or more implements or attachments of the work vehicle.

SUMMARY

Various aspects of examples of the present disclosure are set out in the claims.

In accordance with an embodiment of the present disclosure, a hydraulic pump drive assembly to supply hydraulic fluid for a work vehicle includes an electric machine configured to convert electrical energy from an electrical supply line to rotary motion, a hydraulic pump configured to circulate the hydraulic fluid through a hydraulic supply line from the rotary motion of the electric machine, and a fixture having a first rotary machine interface configured to mount the electric machine to the fixture, a second rotary machine interface configured to mount the hydraulic pump to the fixture, and a work vehicle interface configured to mount the fixture to the work vehicle such that the hydraulic pump and the electric machine are fixed to the work vehicle through the fixture.

The electric machine may comprise an electric machine axial end and an electric machine mounting face disposed at the electric machine axial end. The first rotary machine interface may contact the electric machine only at the electric machine mounting face. The electric machine may comprise a gearbox disposed at the electric machine axial end such that the electric machine mounting face is disposed at the gearbox of the electric machine. The gearbox may comprise an epicyclic gearbox. The hydraulic pump may comprise a hydraulic pump axial end and a hydraulic pump mounting face disposed at the hydraulic pump axial end. The second rotary machine interface may contact the hydraulic pump only at the hydraulic pump mounting face. A coupling may be configured to couple the electric machine to the hydraulic pump. The fixture may enclose the coupling. The hydraulic pump and the electric machine may be rigidly fixed to the work vehicle only by the fixture. The electrical supply line may be connected to an electrical battery source onboard the work vehicle to supply the electrical energy to the electric machine. The work vehicle interface may be configured to directly fix the fixture to a chassis of the work vehicle.

In accordance with an embodiment of the present disclosure, a rotary machine fixture to couple a first rotary machine to a second rotary machine and to fix the first rotary machine and the second rotary machine to a work vehicle includes a first rotary machine interface configured for mounting the first rotary machine, a second rotary machine interface configured for mounting the second rotary machine, a work vehicle interface configured for mounting the fixture to the work vehicle such that the first rotary machine and the second rotary machine are rigidly fixed to the work vehicle through the work vehicle interface, and a cover portion disposed axially between the first rotary machine interface and the second rotary machine interface and defining an internal coupling area configured to accommodate a coupling to couple the first rotary machine to the second rotary machine.

At least one of the first rotary machine and the second rotary machine may comprise a hydraulic pump. At least one of the first rotary machine and the second rotary machine comprises an electric machine. The electric machine may comprise a gearbox. The gearbox may comprise an epicyclic gearbox. The first rotary machine interface may be configured such that the first rotary machine is rigidly fixed to the fixture only through the first rotary machine interface. The second rotary machine interface may be configured such that the second rotary machine is rigidly fixed to the fixture only through the second rotary machine interface. The first rotary machine interface may be disposed at a first fixture side. The second rotary machine interface may be disposed at a second fixture side opposite from the first fixture side. The work vehicle interface may be disposed axially between the first rotary machine interface and the second rotary machine interface. The work vehicle interface may be configured to rigidly fix the fixture directly to a chassis of the work vehicle.

The above and other features will become apparent from the following description and accompanying drawings.

BRIEF DESCRIPTION OF THE DRAWINGS

The detailed description of the drawings refers to the accompanying figures in which:

FIG. 2 is a cross-sectional view of a hydraulic pump drive assembly and a rotary machine fixture in accordance with an embodiment of the present disclosure.

Like reference numerals are used to indicate like elements throughout the several figures.

DETAILED DESCRIPTION

Figure 1:
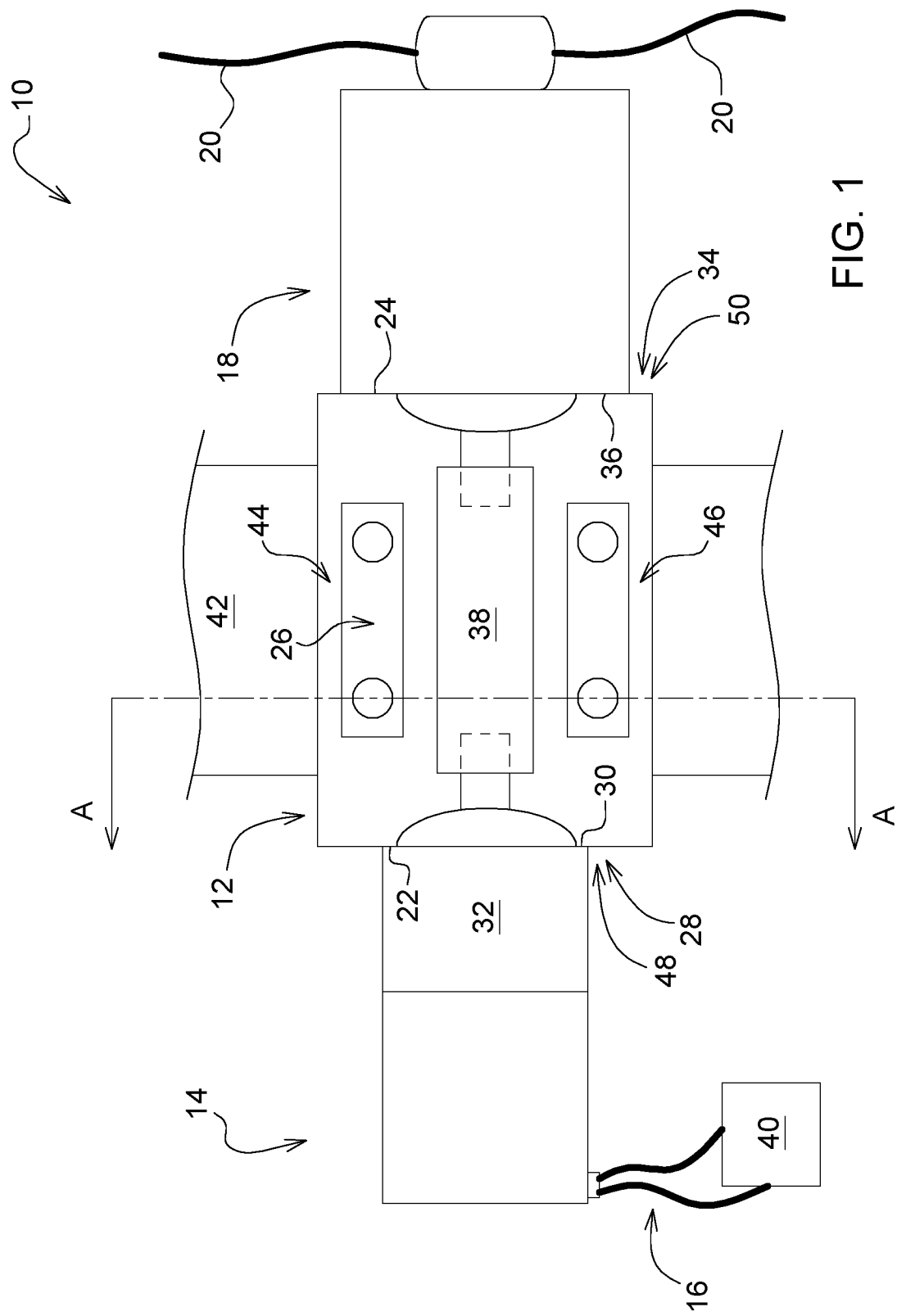
FIG. 1 illustrates a hydraulic pump drive assembly and a rotary machine fixture in accordance with an embodiment of the present disclosure.

At least one embodiment of the subject matter of this disclosure is understood by referring to FIGS. 1 and 2 of the drawings.

Reference is now made to FIGS. 1 and 2, which illustrate a hydraulic pump drive assembly 10 and a rotary machine fixture 12 in accordance with an embodiment of the present disclosure. The assembly 10 of an embodiment supplies hydraulic fluid for a work vehicle (not shown). The work vehicle may include any agricultural, construction, utility, or other off-road vehicle in various embodiment of the present disclosure.

The assembly 10 of an embodiment includes an electric machine 14 configured to convert electrical energy from an electrical supply line 16 to rotary motion. The electric machine 14 of an embodiment includes an electric machine axial end 28 and an electric machine mounting face 30 disposed at the electric machine axial end 28. The electric machine 14 is or includes a direct or alternating current electric motor in one or more embodiments. The electric machine 14 further includes a gearbox 32 disposed at the electric machine axial end 28 in an embodiment. In such an embodiment, the electric machine mounting face 30 is disposed at the gearbox 32 of the electric machine 14. In an embodiment, the gearbox 32 includes an epicyclic or planetary gearbox. In one or more embodiments, the gearbox 32 includes a fixed gear ratio, as in the illustrated embodiment, or may include a multi-gear or variable gear ratio, including an infinitely or continuously variable ratio, such that the output of the electric machine 14 may be varied automatically or by manual operation. The electrical supply line 16 is shown in the embodiment of FIG. 1 as a pair of positive and negative wires, but the electrical supply line 16 of other embodiments may include any one or more wires, conduits, or other connections. The electrical supply line 16 of an embodiment is connected to an electrical battery source 40 onboard the work vehicle to supply the electrical energy to the electric machine 14 to produce the rotary motion. In an embodiment, the electrical supply line 16 is connected to another electrical energy source, such as an electrical grid, an onboard generator, a solar panel, a fuel cell, and/or another electrical energy generating or converting device or system.

As shown in FIG. 1, the assembly 10 further includes a hydraulic pump 18 configured to circulate the hydraulic fluid through a hydraulic supply line 20 from the rotary motion of the electric machine 14. The hydraulic supply line 20 of the illustrated embodiment is shown as a pair of high pressure and low pressure conduits or lines, but the hydraulic supply line 20 of other embodiments may include any one or more conduits, lines, or other connections. The hydraulic pump 18 of an embodiment includes a hydraulic pump axial end 34 and a hydraulic pump mounting face 36 disposed at the hydraulic pump axial end 34. The hydraulic pump 18 of the illustrated embodiment includes a gear pump, a gerotor pump, a peristaltic pump, a vane pump, a swashplate pump, a piston pump, and/or any other rotary or similar devices configured to convert rotary motion into movement or pressurization of a fluid. The hydraulic supply line 20 of one or more embodiments is connected to one or more implements, attachments, accessories, cylinders, accumulators, hydraulic motors, reservoirs, and/or other actuators, components, and/or devices onboard or offboard the work vehicle that receive hydraulic fluid from and/or supply hydraulic fluid to the hydraulic pump 18.

The assembly 10 further includes a rotary machine fixture 12. The fixture 12 includes a first rotary machine interface 22 configured to mount the electric machine 14 to the fixture 12. The fixture 12 further includes a second rotary machine interface 24 configured to mount the hydraulic pump 18 to the fixture 12. The fixture 12 further includes a work vehicle interface 26 configured to mount the fixture 12 to the work vehicle. The work vehicle interface 26 of an embodiment is configured to directly fix the fixture 12 to a chassis 42 of the work vehicle. The work vehicle interface 26 of an embodiment is disposed axially between the first rotary machine interface 22 and the second rotary machine interface 24.

The first rotary machine interface 22 is disposed at a first fixture side 48. The second rotary machine interface 24 is disposed at a second fixture side 50 opposite from the first fixture side 48. In an embodiment, the first rotary machine interface 22 contacts the electric machine 14 only at the electric machine mounting face 30. In an embodiment, the second rotary machine interface 24 contacts the hydraulic pump 18 only at the hydraulic pump mounting face 36.

In the illustrated embodiment, the hydraulic pump 18 and the electric machine 14 are fixed to the work vehicle through the fixture 12. In at least one embodiment, the hydraulic pump 18 and the electric machine 14 are physically or otherwise supported only by the fixture 12. In at least one embodiment, the hydraulic pump 18 and the electric machine 14, not including the electrical supply line 16 and the hydraulic supply line 20 or any other electrical, hydraulic, or any other fluid or energy connection, are physically or otherwise supported only by the fixture 12. In at least one embodiment, the hydraulic pump 18 and the electric machine 14 are coupled to the work vehicle only by the fixture 12 and the electrical, hydraulic, and/or other fluid or energy supplying connections. In at least one embodiment, the hydraulic pump 18 and the electric machine 14 are rigidly fixed to the work vehicle only by the fixture 12. As illustrated in FIG. 1, the hydraulic pump 18 of an embodiment is mounted to the fixture 12 at the second rotary machine interface 24 so as to form a cantilevered structure and/or the electric machine 14 of an embodiment is mounted to the fixture 12 at the first rotary machine interface 22 so as to form a cantilevered structure.

The assembly 10 further includes a coupling 38 configured to couple the electric machine 14 to the hydraulic pump 18. In the illustrated embodiment, the fixture 12 encloses the coupling 38. In one or more additional embodiments, the fixture 12 encircles, surrounds, or covers the coupling 38, and/or the fixture 12 encloses, surround, or covers the coupling 38 from the hydraulic pump mounting face 36 to the electric machine mounting face 30.

FIG. 2 is a cross-sectional view of the assembly 10 and the fixture 12 through line A-A of FIG. 1. As best shown in FIG. 2, the fixture 12 of one or more embodiments includes a cover portion 44 disposed axially between the first rotary machine interface 22 and the second rotary machine interface 24. In an embodiment, the cover portion 44 defines an internal coupling area 46 configured to accommodate the coupling 38 to couple the first rotary machine 14 to the second rotary machine 18. In the illustrated embodiment, the cover portion 44 is integral with the first rotary machine interface 22 and the second rotary machine interface 24, but the cover portion 44 may be formed separately in additional embodiments.

In one or more embodiments not shown, the first rotary machine 14 and/or the second rotary machine 18 may include an electric, hydraulic, pneumatic, and/or other motor or device, and any combination thereof. In a non-limiting example, the assembly 10 of an embodiment not illustrated includes a hydraulic motor as the first rotary machine 14 and an electric machine as the second rotary machine 18 such that the hydraulic motor may drive the electric machine as a generator or a motor-generator in one or more configurations. In another non-limiting example, the assembly 10 of an embodiment not illustrated includes the first rotary machine 14 and the second rotary machine 18 being bidirectional and/or configured or capable of operating in reverse such that hydraulic, electrical, and/or other pressure or energy may be recaptured as or converted to electrical energy by the first rotary machine 14, such as by generating electricity with hydraulic fluid flow.

Although not illustrated, the assembly 10 and/or the fixture 12 in further embodiments may be duplicated such that two or more fixtures 12 are mounted or otherwise configured to be connected to the work vehicle to allow two or more first rotary machines 14 to be coupled to two or more second rotary machines 18 in a parallel arrangement. In such an arrangement, the two sets of rotary machines 14, 18 may share the electrical supply line(s) 16 and/or the hydraulic supply line(s) 20 or such lines 16, 20 may be separate. In such an embodiment, the plurality of fixtures 12 may be integrally formed or formed separately and joined, may share the internal coupling area 46 formed by a single cover portion 44 or have multiple cover portions 44 and internal coupling areas 46, and may share a single work vehicle interface 26 or include multiple work vehicle interfaces 26.

Further, in some embodiments of the present disclosure, any number of one or more work vehicle interface(s) 26 may be included with the assembly 10 and/or the fixture 12. Further, in non-illustrated embodiments, the one or more work vehicle interface(s) 26 may be located on any one or more side(s) or other portion(s) of the cover portion 44 or other portion of the assembly 10 or the fixture 12.

The assembly 10 and the fixture 12 of the embodiments described herein provides a compact and flexible arrangement to couple one or more hydraulic pumps or other rotary machines to a location of the chassis 42 of the work vehicle. The assembly 10 and the fixture 12 of one or more embodiments allow such coupling using standard rotary machine face coupling methods, geometries, and hardware. The arrangement allows hydraulic or other energy supply to any portion of the work vehicle and/or offboard the work vehicle using the electric machine and/or another rotary machine. Accordingly, as electrification of vehicle drivetrain, implements, attachments, and accessories increases, the assembly 10 and the fixture 12 increase the ability to provide hydraulic and/or other power to such vehicle portions using the more readily available electrical and/or other energy sources of the vehicle without extensive mechanical or other coupling means.

As used herein, "e.g." is utilized to non-exhaustively list examples and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A hydraulic pump drive assembly to supply hydraulic fluid for a work vehicle, the assembly comprising:
    an electric machine configured to convert electrical energy from an electrical supply line to rotary motion;
    a hydraulic pump configured to circulate the hydraulic fluid through a hydraulic supply line from the rotary motion of the electric machine;
    a fixture having a first rotary machine interface configured to mount the electric machine to the fixture, a second rotary machine interface configured to mount the hydraulic pump to the fixture, and a work vehicle interface configured to mount the fixture to the work vehicle such that the hydraulic pump and the electric machine are fixed to the work vehicle through the fixture;
    wherein the electric machine comprises an electric machine axial end and an electric machine mounting face disposed at the electric machine axial end, and wherein the first rotary machine interface contacts the electric machine only at the electric machine mounting face;
    wherein the electric machine comprises a gearbox disposed at the electric machine axial end such that the electric machine mounting face is disposed at the gearbox of the electric machine; and
    wherein the electric machine is operably coupled to the hydraulic pump such that energization of the electric supply lines causes the electric machine to drive the hydraulic pump.

2. The assembly of claim 1, wherein the gearbox comprises an epicyclic gearbox.

3. The assembly of claim 1, wherein the hydraulic pump comprises a hydraulic pump axial end and a hydraulic pump mounting face disposed at the hydraulic pump axial end, and wherein the second rotary machine interface contacts the hydraulic pump only at the hydraulic pump mounting face.

4. The assembly of claim 1, further comprising a coupling configured to couple the electric machine to the hydraulic pump, wherein the fixture encloses the coupling.

5. The assembly of claim 1, wherein the hydraulic pump and the electric machine are rigidly fixed to the work vehicle only by the fixture.

6. The assembly of claim 1, wherein the electrical supply line is connected to an electrical battery source onboard the work vehicle to supply the electrical energy to the electric machine.

7. The assembly of claim 1, wherein the work vehicle interface is configured to directly fix the fixture to a chassis of the work vehicle.

8. A rotary machine fixture to couple a first rotary machine to a second rotary machine and to fix the first rotary machine and the second rotary machine to a work vehicle, the fixture comprising:
    a first rotary machine interface configured for mounting the first rotary machine,
    a second rotary machine interface configured for mounting the second rotary machine;
    a work vehicle interface configured for mounting the fixture to the work vehicle such that the first rotary machine and the second rotary machine are rigidly fixed to the work vehicle through the work vehicle interface;
    a cover portion disposed axially between the first rotary machine interface and the second rotary machine interface and defining an internal coupling area configured to accommodate a coupling to couple the first rotary machine to the second rotary machine;

wherein the first rotary machine interface is configured such that the first rotary machine is rigidly fixed to the fixture only through the first rotary machine interface; and wherein the first rotary machine interface is disposed at a first fixture side, and wherein the second rotary machine interface is disposed at a second fixture side opposite from the first fixture side.

9. The fixture of claim 8, wherein at least one of the first rotary machine and the second rotary machine comprises a hydraulic pump.

10. The fixture of claim 8, wherein at least one of the first rotary machine and the second rotary machine comprises an electric machine.

11. The fixture of claim 10, wherein the electric machine comprises a gearbox.

12. The fixture of claim 11, wherein the gearbox comprises an epicyclic gearbox.

13. The fixture of claim 8, wherein the second rotary machine interface is configured such that the second rotary machine is rigidly fixed to the fixture only through the second rotary machine interface.

14. The fixture of claim 8, wherein the work vehicle interface is disposed axially between the first rotary machine interface and the second rotary machine interface.

15. The fixture of claim 8, wherein the work vehicle interface is configured to rigidly fix the fixture directly to a chassis of the work vehicle.

16. A hydraulic pump drive assembly to supply hydraulic fluid for a work vehicle, the assembly comprising:

an electric machine configured to convert electrical energy from an electrical supply line to rotary motion;

a hydraulic pump operably coupled to the electric machine and configured to circulate the hydraulic fluid through a hydraulic supply line from the rotary motion of the electric machine; and a fixture having a first rotary machine interface configured to mount the electric machine to the fixture, a second rotary machine interface configured to mount the hydraulic pump to the fixture, and a work vehicle interface configured to mount the fixture to the work vehicle such that the hydraulic pump and the electric machine are fixed to the work vehicle through the fixture;

wherein the hydraulic pump and the electric machine are rigidly fixed to the work vehicle only by the fixture.

17. The assembly of claim 16, wherein the electric machine comprises an electric machine axial end and an electric machine mounting face disposed at the electric machine axial end, and wherein the first rotary machine interface contacts the electric machine only at the electric machine mounting face.

18. The assembly of claim 17, wherein the electric machine comprises a gearbox disposed at the electric machine axial end such that the electric machine mounting face is disposed at the gearbox of the electric machine.

19. The assembly of claim 18, wherein the gearbox comprises an epicyclic gearbox.

20. The assembly of claim 16, wherein the hydraulic pump comprises a hydraulic pump axial end and a hydraulic pump mounting face disposed at the hydraulic pump axial end, and wherein the second rotary machine interface contacts the hydraulic pump only at the hydraulic pump mounting face.

21. The assembly of claim 16, further comprising a coupling configured to couple the electric machine to the hydraulic pump, wherein the fixture encloses the coupling.

22. The assembly of claim 16, wherein the electrical supply line is connected to an electrical battery source onboard the work vehicle to supply the electrical energy to the electric machine.

23. The assembly of claim 16, wherein the work vehicle interface is configured to directly fix the fixture to a chassis of the work vehicle.

24. A rotary machine fixture to couple a first rotary machine to a second rotary machine and to fix the first rotary machine and the second rotary machine to a work vehicle, the fixture comprising:

a first rotary machine interface configured for mounting the first rotary machine, a second rotary machine interface configured for mounting the second rotary machine;

a work vehicle interface configured for mounting the fixture to the work vehicle such that the first rotary machine and the second rotary machine are rigidly fixed to the work vehicle through the work vehicle interface;

a cover portion disposed axially between the first rotary machine interface and the second rotary machine interface and defining an internal coupling area configured to accommodate a coupling to couple the first rotary machine to the second rotary machine;

wherein the second rotary machine interface is configured such that the second rotary machine is rigidly fixed to the fixture only through the second rotary machine interface; and wherein the first rotary machine interface is disposed at a first fixture side, and wherein the second rotary machine interface is disposed at a second fixture side opposite from the first fixture side.

25. The fixture of claim 24, wherein at least one of the first rotary machine and the second rotary machine comprises a hydraulic pump.

26. The fixture of claim 24, wherein at least one of the first rotary machine and the second rotary machine comprises an electric machine.

27. The fixture of claim 26, wherein the electric machine comprises a gearbox.

28. The fixture of claim 27, wherein the gearbox comprises an epicyclic gearbox.

29. The fixture of claim 24, wherein the first rotary machine interface is configured such that the first rotary machine is rigidly fixed to the fixture only through the first rotary machine interface.

30. The fixture of claim 24, wherein the work vehicle interface is disposed axially between the first rotary machine interface and the second rotary machine interface.

31. The fixture of claim 24, wherein the work vehicle interface is configured to rigidly fix the fixture directly to a chassis of the work vehicle.

32. The fixture of claim 24, wherein the coupling is coaxial with an output shaft of one of the first rotary machine and the second rotary machine and an input shaft of the other of the first rotary machine and the second rotary machine.

* * * * *